United States Patent [19]

Meloni

[11] 4,250,712
[45] Feb. 17, 1981

[54] PLANT FOR THE PRODUCTION OF THERMAL ENERGY FROM THE SOLAR HEAT

[75] Inventor: Stefano Meloni, Fabriano, Italy

[73] Assignee: Merloni Igienico Sanitari S.p.A., Fabriano, Italy

[21] Appl. No.: 35,774

[22] Filed: May 3, 1979

[30] Foreign Application Priority Data

May 19, 1978 [IT] Italy .............................. 49466 A/78

[51] Int. Cl.³ ...................... F25B 27/00; F25B 27/02; F25B 13/00
[52] U.S. Cl. ........................................ 62/2; 62/238 L; 62/324 D; 126/422; 165/48 S
[58] Field of Search .................... 165/48 S, 105; 62/2, 62/238 E, 324 D, 196 C; 126/422, 434, 437; 237/67

[56] References Cited

U.S. PATENT DOCUMENTS

| 4,017,286 | 4/1977 | English et al. | 62/196 C |
|---|---|---|---|
| 4,050,445 | 9/1977 | Huse | 126/422 |
| 4,055,055 | 10/1977 | Horwitz | 126/434 |
| 4,061,131 | 12/1977 | Bohanon | 237/67 |
| 4,123,003 | 10/1978 | Winston | 165/48 S |
| 4,129,118 | 12/1978 | Banke | 126/422 |
| 4,169,554 | 10/1979 | Camp | 165/48 S |

Primary Examiner—Lloyd L. King
Attorney, Agent, or Firm—Young & Thompson

[57] ABSTRACT

A plant for the production of thermal energy by using solar heat comprising in combination a solar header fed with a refrigerating flluid, a condenser arranged within an user element, a series of ducts connecting the header to the condenser to form a natural circulation circuit, a second circuit inserted into the first one which allows to attain the heat pump cycle and apparatus for selectively and automatically switching over the plant from the one to the other circuit in dependence on both the outer temperature and temperature of the header, said heat pump circuit comprising a compressor, inserted between the header and condenser and a capillary choke valve arranged within a return duct extending from the condenser to the header.

3 Claims, 1 Drawing Figure

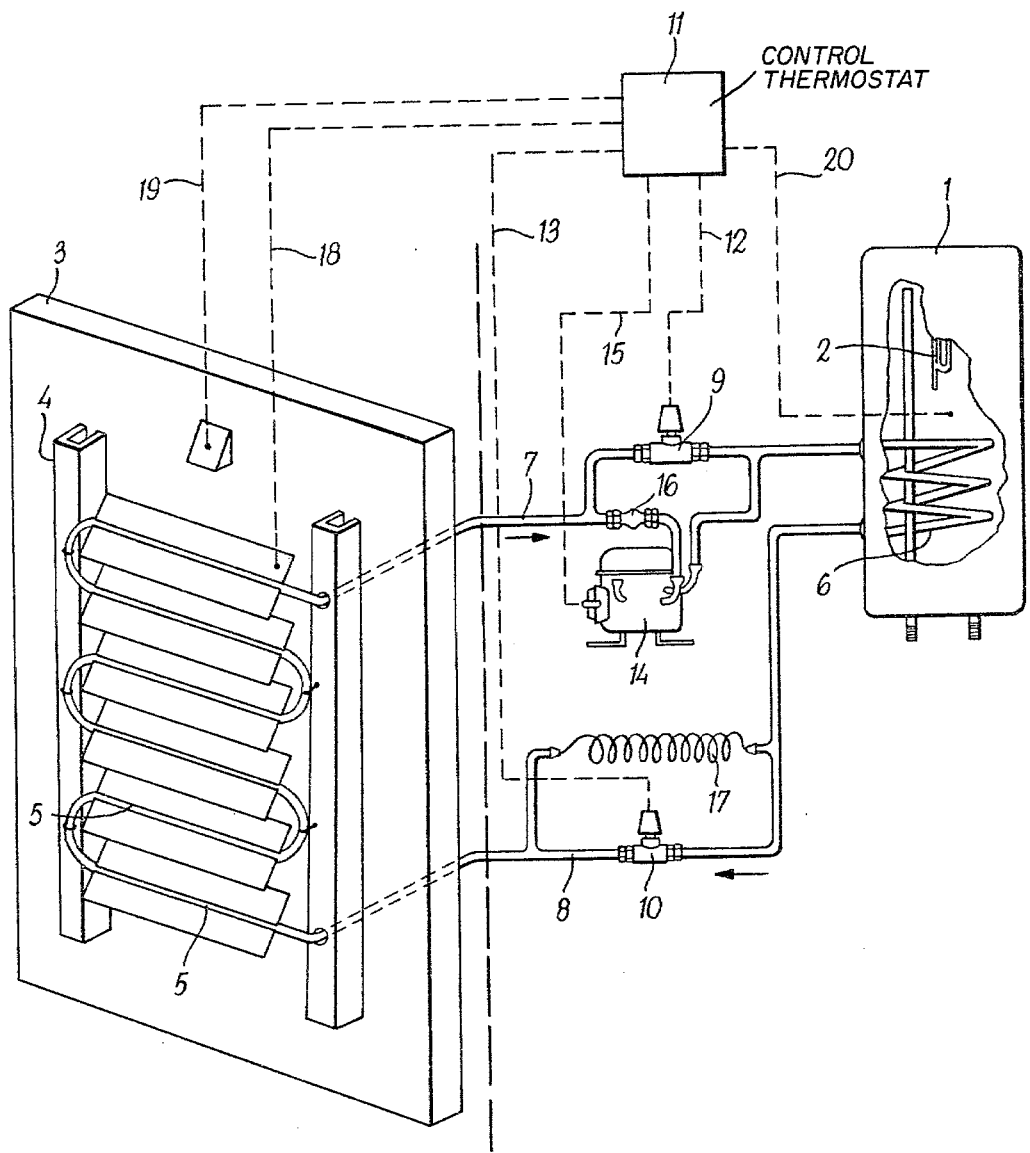

PLANT FOR THE PRODUCTION OF THERMAL ENERGY FROM THE SOLAR HEAT

The present invention relates to a plant for production of thermal energy from the solar heat. More precisely, the invention relates to a solar plant for the production of thermal energy, operating both by natural circulation and heat pump.

As is well known to those skilled in the art, the natural circulation plants employ a thermoconvecting fluid (for example Freon) which is heated in a header by the direct effect of the sun and gives up the heat to an user element, for example a water tank to be heated, by a condenser immerged in said tank.

Similarly, there are known heat pump plants wherein the collector, operating also as evaporator, is maintained at a temperature lower than that of the outer atmosphere; in this way, even if the sun is covered, the thermal energy may be absorbed from the outer air. The heater does not require any heat insulation since it is at a temperature lower than that of the surrounding atmosphere. A compressor having suitable characteristics, inserted between the evaporator and condenser, causes a further heating of the fluid coming from the evaporator so as to put it in condition of giving up the heat to the user means. It is sufficient to provide the compressor with a power adapted to take up from the evaporator a quantity of thermal energy higher than that which it may receive, at the optimal climatic conditions, both from the atmosphere and direct insolation. A feeler applied to the header stops the compressor when the temperature approaches the freezing point and another feeler inserted into the user element (water) stops the compressor when the temperature of the heated means is sufficiently high.

The purpose of the present invention is to provide a plant adapted to operate in both the natural circulation cycle and heat pump cycle, so as to attain the maximal yield of the plant, since it may operate, under any climatic variation, with the optimum cycle.

According to the invention, a plant is provided which comprises in combination a solar header supplied with a refrigerating fluid, a condenser arranged within the user element, a series of ducts connecting the header to the condenser according to the natural circulation cycle, a second circuit coupled with the first one, which second circuit causes the plant to operate according to the heat pump cycle, and means to selectively and automatically switch over the plant from one to the other cycle in dependence on both the outer temperature and temperature of the heated means.

Said heat pump circuit comprises a compressor inserted between the header and condenser and a capillary valve, arranged in the return duct from the condenser to the header.

Moreover, according to the invention, said means for automatically switching over the plant from the natural circulation cycle to the heat pump cycle consist of heat sensitive elements causing the actuation of a pair of electric valves, which valves engage or disengage said compressor and said capillary valve in dependence on both the outer temperature and temperature of the means to be heated.

The invention will be now disclosed with reference to the attached drawing which shows, only for illustrative and not limitative purpose, a preferred embodiment of the invention, applied to a plant for the production of hot water for hygienic use.

Referring now to the drawing, the reference numeral 1 denotes an user element, for example a conventional water heater, provided with a thermostat-resister unit 2.

In a suitable place of the building, for example on an outer wall 3 thereof, is mounted by means of supports 4 a header 5, consisting of a non-insulated pipe coil provided with shutter plates. The header 5, which operates also as evaporator, is connected to the condenser 6 arranged within the water heater 1 through an input duct 7 and the condenser 6 is in turn connected with the base of the evaporator-header 5 through a return duct 8. The above disclosed assembly forms a closed circuit in which a thermoconvecting fluid, having a low boiling point, for example Freon 22, is circulated.

In the ducts 7 and 8 there are provided electric valves 9 and 10 controlled by a control thermostat 11 through conductors 12 and 13. The electric valve 9 is by-passed by a compressor 14 controlled by a conductor 15 leading to the control thermostat 11. Upstream of said compressor a dehumidifier filter 16 is provided.

In the return duct 8 a capillary choke valve 17 is provided which by-passes the electric valve 10.

To the control thermostat 11 there are connected three heat sensitive elements, namely a feeler 18 provided for taking the temperature of the header, a reference feeler 19 for controlling the balance temperature of the header and a feeler 20 taking the temperature of the water to be heated.

The operation is as follows: when the temperature of the header, taken by the feeler 18, is higher than that taken by the feeler 20, the thermostat 11 causes the electric valves 9 and 10 to open and the fluid circulates in a natural circulation circuit, thus cutting out the compressor 14 and the capillary valve 17. The fluid, heated in the header 5 and caused to boil, goes through the duct 7, enters the condenser 6, and gives up its heat to the water contained in the water heater 1, thus causing the fluid to cool. The fluid flows then through the return duct 8 and enters the base of the evaporator-header 5 in the liquid state. Thereafter the cycle is repeated.

When the temperature of the header taken by the feeler 18 is lower than or equal to that of the feeler 20 (the water to be heated), the thermostat closes the two electric valves 9 and 10 and causes the compressor 14 to start. In this situation the transfer of the heat occurs according to the principle of the heat pump and the fluid passes through the compressor 14 which causes it to heat and thence through the condenser 6 which causes it to cool and through the choke valve 17 which causes a pressure drop so as to complete the passage of the fluid into the liquid state.

The reference feeler 19 takes the temperature of a small plate made of the same material as the header 5, so that the temperature of the said feeler is that which the header 5 would haul if it were not refrigerated by the compressor; if the temperature of the feeler 19 is substantially higher than that of the feeler 20, the plant may be usefully operated with the natural circulation. In such a case, the thermostat 11 stops the compressor 14, opens the electric valves 9 and 10 and restores the natural circulation as already described hereabove.

The feelers 18 and 20 have the control function to avoid both the freezing of the header and overheating of the water in the dehumidification element.

From the above it clearly results that the plant is capable to operate both in the presence and partial or total absence of the sun, provided that the outer temperature is higher than a given very low value.

If the thermalenergy produced by the above disclosed plant should not be sufficient to attain the desired temperature of the water, the resistor-thermostat unit 2 may operate as an intergrated energy source, as in a conventional solar energy plant for the heating of sanitary water.

The present invention has been disclosed in a preferred embodiment thereof, but it is understood that several modifications might be adopted by one silled in the art without departing from the scope of the present invention.

Having thus described the present invention, what is claimed is:

1. A plant for the production of thermal energy from solar heat, comprising a solar header fed with a refrigerating fluid, a condenser within a user element, a series of ducts connecting a header to the condenser, said ducts including a first duct leading from the header to the condenser and containing a first electric valve, and a second duct leading from the condenser to the header and containing a second electric valve, a compressor in parallel relation with said electric valve in said first duct for bypassing said electric valve, and a capillary choke valve in said second duct in parallel with said second electric valve for bypassing said second electric valve, said plant providing a natural circulation circuit through said header and condenser and first and second electric valves, and a heat pump circuit through said header and condenser and compressor and capillary choke valve, and temperature-responsive means for opening and closing said electric valves thereby to open said natural circulation circuit through said electric valves when the temperature of a portion of said plant is above a predetermined value and for closing said electric valves to establish said heat pump circuit through said compressor and choke valve and actuate said compressor when said temperature is below said predetermined value.

2. A plant as claimed in claim 1, said temperature-responsive means comprising heat-sensitive elements comprising a first feeler which takes the temperature of the header, a second feeler which takes a reference temperature from a plate made of the same material as the header but mechanically unconnected with the header, and a third feeler which takes the temperature of the user element.

3. A plant as claimed in claim 2, in which said feelers are operatively connected with a control thermostat which controls also the starting and stopping of the compressor.

* * * * *